United States Patent
Figurin et al.

(10) Patent No.: US 6,571,386 B1
(45) Date of Patent: May 27, 2003

(54) APPARATUS AND METHOD FOR PROGRAM OPTIMIZING

(75) Inventors: Mikhail Figurin, St. Petersburg (RU); Mikhail Okrugin, St. Petersburg (RU); Dmitriy Barmenkov, St. Petersburg (RU)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/508,558

(22) PCT Filed: Oct. 13, 1998

(86) PCT No.: PCT/RU98/00326

§ 371 (c)(1),
(2), (4) Date: Mar. 13, 2000

(87) PCT Pub. No.: WO00/22523

PCT Pub. Date: Apr. 20, 2000

(51) Int. Cl.⁷ .................................................. G06T 9/45
(52) U.S. Cl. ........................... 717/154; 712/6; 712/7; 712/222; 717/141; 717/154
(58) Field of Search ............................... 717/140–161; 712/1–7, 222

(56) References Cited

U.S. PATENT DOCUMENTS

| | | | |
|---|---|---|---|
| 5,107,418 A | * 4/1992 | Cramer et al. ............... | 717/146 |
| 5,854,934 A | * 12/1998 | Hsu et al. .................... | 717/161 |
| 5,966,537 A | * 10/1999 | Ravichandran ............. | 717/158 |
| 6,175,957 B1 | * 1/2001 | Ju et al. ....................... | 717/156 |

OTHER PUBLICATIONS

Johnson R. et al.: "Dependence–Based Program Analysis" ACM Sigplan Notices, vol. 28, No. 6, Jun. 1, 1993, pp. 78–89, XP000380801.

Aho et al., "Compilers: Principles, Techniques and Tools" 1996, Addison–Wesley Publishing Co., XP002107029, pp. 608–634.

Johnson et al.: The Program Structure Tree: Computing Control Regions in Linear Time ACM Sigplan Notices; vol. 29, No. 6, Jun. 1994, pp. 171–185, XP000450415, Orlando, USA.

Pollock L L et al.: "An Incremental Version of Iterative Data Flow Analysis", IEEE Transactions on Software Engineering; vol. 15, No. 12, Dec. 1, 1989, pp. 1537–1549, XP000086025.

C. Click :"Global Code Motion; Global Value Numbering" ACM Sigplan, vol. 30, No. 6, pp 246–257, 1995.

Barbara G. Ryder et al., "Elimination Algorithms for Data Flow Analysis" XP–000916854, ACM Computing Surveys, vol. 18, No. 3, Sep. 1996, pp. 278–316.

* cited by examiner

*Primary Examiner*—Gregory Morse

(57) ABSTRACT

An optimizer (100) comprises a memory (110) and a processor (130). The memory stores a program (200) to be optimized and optimization software (301). Controlled by the optimization software, the processor (120) (a) determines local vectors ("local") in instructions of the program (200) which indicate the use of resources by the instructions (use-vectors, exh-vectors); (b) scans the program (200) for Single-Entry-Single-Exit (SESE) structures (U, T, V, S); and (c) determines SESE vectors from the local vectors. The SESE vectors indicate the use of resources by the SESE structures and can be combined by the optimizer to obtain a program vector. When some instructions are modified, then optimizer (100) only re-calculates the SESE vector of the corresponding SESE and re-combines the old SESE vector with the modified SESE vector to determine a new program vector.

14 Claims, 2 Drawing Sheets

APPARATUS AND METHOD FOR PROGRAM OPTIMIZING

FIELD OF THE INVENTION

The present invention generally relates to data processing, and, more particularly, to a program optimizer and to an optimization method.

BACKGROUND OF THE INVENTION

The optimization of software programs is important to save memory space, to speed up program execution and to verify program operation. Program resources are, for example, variables, the bits in flag registers, or the information stored in memory arrays. There is a task to reduce the number of program resources (e.g., variables) and source code words (e.g., instructions). A useful reference for optimization is: [1] Cliff Rick: "Global Code Motion, Global Value Numbering", ACM SIGPLAN 1995, La Jolla, Calif. USA, pages 246–257. An optimizer obtains the so called "live information" of resources by distinguishing whether (a) a resource accessed by an instruction is used further in the software program ("USE-resources") or (b) the resource is not further used ("EXH-resource") and considered exhausted.

Optimizers for high level programming language, such as, for example, C or PASCAL are known. However, saving resources in assembly language programs is more complex due to many global variables in such programs. The optimizer must analyze a program, modify the program and analyze it again. Such an approach is time and memory consuming.

The present invention seeks to provide a program optimizer which mitigates or avoids disadvantages and limitations of the prior art.

DETAILED DESCRIPTION OF A PREFERRED EMBODIMENT

Figure 1:
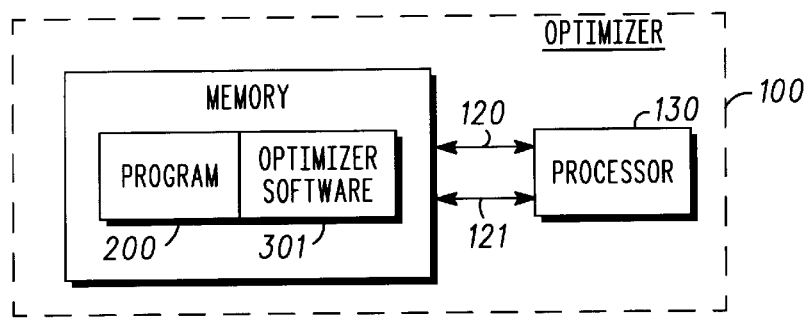
FIG. 1 illustrates a simplified block diagram of a program optimizer according to the present invention.

FIG. 1 illustrates a simplified block diagram of program optimizer 100 (hereinafter optimizer 100) according to the present invention. For example, optimizer 100 can be realized by an all-purpose computer having memory 110, data and address busses 120, 121 and processor 130. Other components, such as peripherals for data input/output are not shown for simplicity. Conveniently, memory 110 of optimizer 100 stores program 200 (cf. FIG. 2) and optimization software 301 which executes the method of the invention (cf. method 300 of FIG. 3).

According to a method of the present invention, optimizer 100 analyses program 200 by distinguishing free and busy resources (i) on a level of Single-Entry-Single-Exit (SESE) structures and (ii) on a program level considering the results of the SESE-analysis. In other words, optimizer 100 analyses program 200 at local and global levels and combines analysis results. After modifying some SESE, optimizer 100 re-analyses only the modified SESEs and uses the results of the previous analysis for a final analysis. This is different from the prior art, where program analysis is performed for the complete program and where some calculations are performed twice. The present invention avoids redundant re-calculations and uses the operation time of optimizer 100 more efficiently.

With details explained later (cf. FIGS. 2–3), optimizer 100 of the present invention comprises: (i) memory 110 which stores program 200 to be optimized and which stores optimization software 301, and (ii) processor 130 receiving commands (according to method 300) from optimization software 301 for (a) determining local vectors in instructions of program 200 to indicate the use of resources by instructions; (b) scanning program 200 for SESE structures; and (c) determining SESE vectors from the local vectors, the SESE vectors indicating the use of resources by the SESE structures.

It is an advantage of the present invention, that program 200 can be written in assembly language. This feature makes the present invention especially useful for programs 200 of embedded applications. Preferably, optimizer 100 does not need to execute program 200. Resources of program 200 are conveniently accessed during execution of program 200 by the application.

Figure 2:
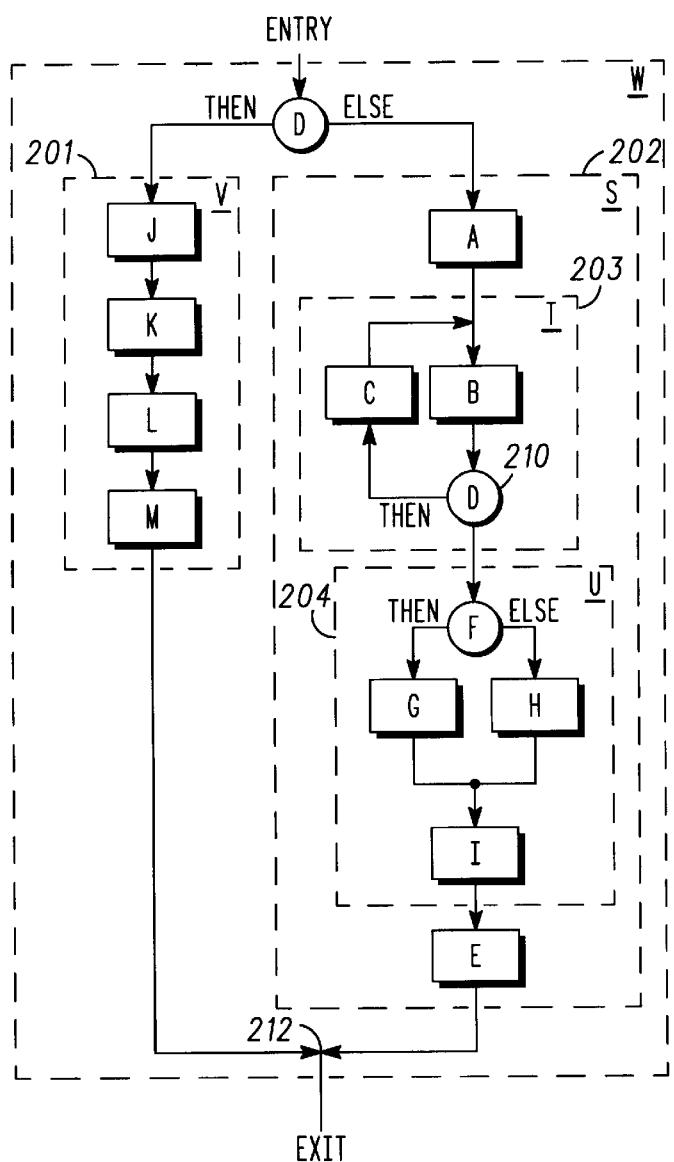
FIG. 2 illustrates a simplified flow chart diagram of a program which is optimized by the optimizer of FIG. 1 by way of example.

FIG. 2 illustrates a simplified flow chart diagram of program 200 which can be optimized by optimizer 100. FIG. 2 is intended to be a non-limiting example. Program 200 comprises instructions A, B, C, D, E, F, G, H, I, J, K, L, and M. The term "node" is used herein as a synonym for "instruction". Instructions Z, D, and F are branch instructions (circle symbols) for conditionally changing the program flow ("then" and "else" alternatives); and instructions A, B, C, H, G, I, E, J, K, L, and M are linear instructions (square symbols) which, preferably, do not change the program flow. Arrows in FIG. 2 illustrate a preferred execution flow of program 200. Dashed frames around some instructions illustrate SESEs S, U, T and V and W (definition later). A representation of program 200 by instructions uses the terms "begin", "end", "if" and "goto" which are well known in the art:

```
00:     begin program 200 (at ENTRY point 210)
                (2.1)
02:         if Z then begin J
06:                         K
08:                         L
10:                         M
12:                     end
14:                else begin A
18:                         B
20:                         if D then begin 0
22:                             goto line 18
24:                         end
26:                         if F then G
28:                             else H
30:                         I
32:                         E
34:                     end
36:     end program 200 (at EXIT point 212)
```

The two-digit numbers on the left side indicate program lines. For convenience of explanation, the term "successor" (singular and plural) will be applied to the execution of program 200. Instruction A has successor B; instruction B has successor D; instruction G has successor I; instruction H has successor I; instruction I has successor E; instruction J has successor K; instruction K has successor L; and instruction L has successor M. The branch instructions Z, D, and F have more than one successor: Instruction Z has successors J and A; instruction D has successors C and F; and instruction F has successors G and H.

Similarly, the term "predecessor" is applied to the execution of program 200. Instruction Z has entry point 210 ("ENTRY") as predecessor; instruction A has predecessor Z; instruction B has predecessors A and C; instruction C has predecessor D; instruction D has predecessor B; instruction F has predecessor D; instructions G and H have predecessor F; instruction I has predecessors G and H; instruction E has predecessor I; instruction J has predecessor Z; instruction K has predecessor J; instruction L has predecessor K; and instruction M has predecessor L. Exit point 212 ("EXIT") has predecessors M and E. In other words, the program flow either (a) splits at the branch instructions (e.g., Z, D, F; $\geq 2$ successors),
(b) merges at merge instructions (e.g., B, E, and EXI; $\geq 2$ predecessors), or
(c) remains unchanged at linear instructions (1 successor, 1 predecessor).

As used herein, a SESE is a group of instructions which complies with the following: (a) A single instruction belonging to the group is always executed first (Single Entry); and (b) There is only a single instruction outside the group which is executed when the program flow leaves the group (Single Exit) at a preceding instruction. This is also illustrated in the graphical representation of FIG. 2. For each dashed frame (e.g., for SESE T), there is only a single arrow (e.g., arrow from A to B) going into the frame (SESE entry) and only a single arrow (e.g., arrow from D to F) leaving the frame (SESE exit).

Instructions can refer to resources. For simplicity of explanation, the resources are assumed to be variables, as for example, variables "a", "b", "c", "d", "e", and "x". The term "variable" used herein is intended to include other hardware and software resources, such as, for example, registers, flags, or memory arrays. For example, instructions J to M can represent the following operations:

$J: x:=a+e$ $K: b:=x$ $L: x:=c$ $M: x:=d$ (2.1a)

The variables on the left sides (of the ":=" symbols) are results; and the variables on the right sides are arguments. It is known in the art to introduce variable vectors. Two vector classifications are used: Use-vectors for each instruction can indicate which variables are used and which are not used. Exh-vectors (for "exhaust") can indicate which variables are modified by the instruction. Further, vectors which classify a single instruction relate are "local vectors"; and vectors which classify two or more instructions are "global vectors".

In general, the use-vectors and the exh-vectors have $\Psi$ binary values ("bits"):

$(bit_1, bit_2, bit_\psi, \ldots, bit_\Psi)$ (2.2)

The bits values are, for example, "1" for presence and "0" for absence of a variable. The bit indices $\psi$ (e.g., from 1 to $\Psi$) follow conveniently the above mentioned alphabetical order, such as $bit_1$ for "a", $bit_2$ for "b", $bit_3$ for "c", $bit_4$ for "d", $bit_5$ for "e", and $bit_6$ for "x". For example, vectors for instruction J are:

$local\_use (J)=(1, 0, 0, 0, 1, 0)$ (2.3)

and $local\_exh (J)=(0, 0, 0, 0, 0, 1);$ (2.4)

and vectors for instruction K are:

$local\_use (K)=(0, 0, 0, 0, 0, 1)$ (2.5)

and $local\_exh (K)=(0, 1, 0, 0, 0, 0).$ (2.6)

A reference vector can be defined as:

$reference="zero"=(0, 0, 0, 0, 0, 0).$ (2.7a)

or can be defined as:

$reference=(1, 1, 1, 1, 1, 1)$ (2.7b)

For convenience, the present invention will be explained in connection with the "zero-vector of definition (2.7a). Persons of skill in the art are able, based on the description herein, to implement method 300 also with a reference vector according to definition (2.7b). The number $\Psi$ of binary value can also be different.

Program 200 can be analyzed by relating vectors for instruction ("inst") and its successor ("succ") or successors, for example as follows:

$global\_use (inst):=+local\_use (inst)-local\_exh (inst)+global\_use (succ)$ (2.8)

$global\_exh (inst):=+local\_exh (inst)-local\_use (inst)+global\_exh (succ).$ (2.9)

The well known expression ":=" indicates that the term on the left side receives a value expressed by operations on the right side. Preferably, calculations according to equations (2.8) and (2.9) are performed substantially simultaneously. The plus + and minus − symbols can represent addition and subtraction of bits according to the following rules:

$1+1=1$ $1+0=1$ $0+1=1$ $1-1=0$ $1-0=1$ $0+0=0$ (2.10)

However, such calculations are intended to be only a convenient example for explanation.

For simplicity of further notation, global use-vectors and global_exh-vectors are collectively referred to as "global vectors". Similarly, local_use-vectors and local_exh-vectors are collectively referred to as "local vectors". Generally, the inotation:

$global (inst):=local (inst) \oplus global (succ)$ (2.11)

illustrates that global vectors referring to an instruction inst can be obtained by any vector operation (represented by the $\oplus$ symbol) between local vectors of the instruction inst and global vectors of the successor succ (or successors). Obtaining instruction vectors (e.g., global (inst) from the successor ("backward traverse") is convenient for explanation, but not essential for the present invention. Optionally, an opposite approach ("forward traverse") is explained later.

For merge instructions and linear instructions inst, "global (succ)" refers to the vectors of a single successor. For branch instructions inst with multiple successors (e.g., successors F and C of instruction D), "global (succ)" stands either (a) for $$global\ (succ) = \bigcup_{n=1}^{N} global\ (succ\_n) \qquad (2.12)$$

to calculate the "global_use" portion of global (inst); or (b) for $$global\ (succ) = \bigcap_{n=1}^{N} global\ (succ\_n) \qquad (2.13)$$

to calculate the "global_exh" portion of global (inst). In the example of FIG. 2, $N \leq 2$. Bit operations are the logical or-operation for the combination ($\cup$) in (2.12) and logical and-operation ($\cap$ symbol) for the intersection ($\cap$) in (2.13), that is:

1 and 1=1

1 and 0=0

0 and 1=0

0 and 0=0 (2.14)

1 or 1=1

1 or 0=1

0 or 1=1

0 or 0=0 (2.15)

According to depth ordering which is well known in the art, program 200 can be analyzed by (a) determining local vectors (e.g., use and exh) for all instructions; (b) assigning analyzing indices to each instruction and (c) calculating global vectors (e.g., use and exh) from ENTRY to EXIT of program 200 in iterations. For example, analyzing indices can be "1" for Z, "2" for J, "3" for K, "4" for L, "5" for M, "7" for A, and so on to "15" for H. Starting conveniently at the highest analyzing index and assuming that a global successor vector is zero, program 200 can be analyzed by the following steps:

global (G):=local (G) ⊕ zero global (J):=local (J) ⊕ global (G)

global (E):=local (E) ⊕ global (J)

global (M):=local (M) ⊕ global (E)

global (L):=local (L) ⊕ global (M)

global (K):=local (K) ⊕ global (L) ...

global (Z):=local (Z) ⊕ global (A) (2.6)

At the end of the analysis, vector global (Z) indicates redundant variables.

After analyzing, some instructions are modified and some variables are deleted and the analysis is performed again. However, such an approach has the disadvantage that some redundant calculations are performed twice. Optimizer 100 of the present invention reduces the number of required operations.

Figure 3:
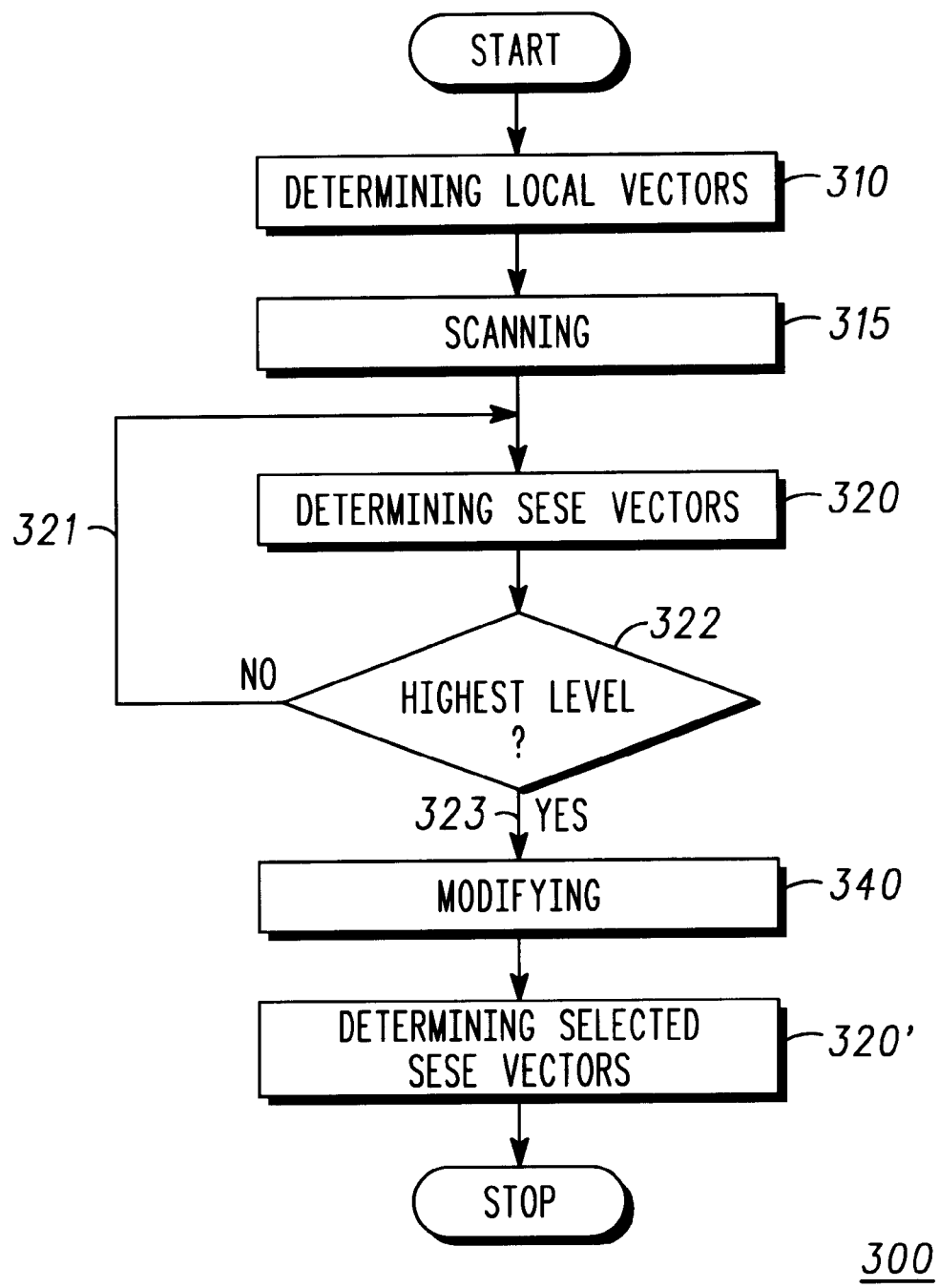
FIG. 3 illustrates a simplified flow chart diagram of a method of the present invention applied in the optimizer of FIG. 1.

FIG. 3 illustrates a simplified flow chart diagram of method 300 of the present invention applied in optimizer 100. Method 300 comprises determining local vectors steps 310, scanning step 315, determining SESE vectors step 320, a conditional repetition of step 320 (line 321, query 322), and optionally, modifying step 340 and step 320'. Arrows and labels START and STOP indicate a preferred method flow.

In determining local vectors step 310, optimizer 100 calculates the local vectors (local_use and local_exh) for each instruction (e.g., for instructions A to Z) and stores the local vectors. Preferably, the local vectors are provided as first partial vectors (e.g., local_use) and as second partial vectors (e.g., local_exh). In the example of FIG. 2, optimizer 100 calculates local_use and local_exh (collectively "local (inst)") for instructions A, B, C, D, E, F, G, H, I, J, K, L, M, and Z.

In scanning step 315, optimizer 100 determines the instructions belonging to each SESE in program 200. Persons of skill in the art know how to do this. In the example of FIG. 2. optimizer detects: (i) SESE T with instructions B, C and D (frame 203); (ii) SESE U with instructions F, G, H, and I (frame 204); (iii) "parent" SESE S with instruction A, "child" SESE T, "child" SESE U, and instruction E; and (iv) SESE V with instructions J, K, L, and M; and SESE W for program 200. In other words, a child-parent-program hierarchy of SESEs is established.

In determining SESE vectors step 320, optimizer calculates the SESE vectors for some or all SESEs using the local vectors of step 3 10. In the example of FIG. 2, optimizer 100 calculates local (U)=global (F) by iteration within SESE U (3.1)

local (T)=global (B) by iteration within SESE T (3.2)

local (V)=global (J) by iteration within SESE V (3.3)

Preferably, optimizer 100 provides the SESE vectors in iterations within the SESE as (cf. equations (2.2) and (2.3)): (a) first global vectors (e.g., global_use (inst)) by adding (+) the first partial vectors (e.g., local_use (inst)) and subtracting (−) the second partial vectors (e.g., local_exh (inst)) and adding first global successor vectors (e.g., global_use (succ)), and (b) second global vectors (e.g., global_exh (inst)) by adding (+) the second partial vectors (e.g., local_exh (inst)) and subtracting (−) the first partial vectors (e.g., local_use (inst)) and adding second local successor vectors (e.g., global_exh (succ)). Details for the iteration are given later.

It is an important feature of the present invention, that optimizer 100, preferably, does not consider program behavior outside the SESE which is currently analyzed. For example, for the determination of local (U) for SESE U. optimizer does not take into account the local vectors of instructions Z, A, B, C, D, E, J, K, L, and M which do not belong to SESE U.

Optimizer 100 repeats step 320 until (cf. "yes"-line 323) it has calculated the global vector (e.g., global (W)) for the complete program 200. In the repetitions, optimizer 100 goes up in the SESE hierarchy. FIG. 3 illustrates the repetition of step 320 by "no"-line 321 of query 322 ("highest level?"). Thereby, optimizer 100 goes from child SESEs to parent SESEs. Vectors which are "global" in the sense of a child SESE become "local" vectors in the sense of the higher-ranking parent SESE. In the example, of FIG. 2, in a first repetition optimizer 100 uses local (U) and local (T) to obtain global (A)=local (S); and in a second repetition optimizer 100 uses local (S) and local (V) to obtain the global vector for SESE W (program 200). The SESE vectors obtained in step 320 identify some variables in the SESE as redundant variables.

The next steps 340 and 320' are performed optionally, when optimizer 100 modifies program 200. In modifying step 340, optimizer 100 deletes the redundant variables ("variables") in the SESEs. In the example of FIG. 2, optimizer 100 modifies instruction K of SESE V which becomes instruction K' (prime marker). In the following determining selected SESE vectors step 320', optimizer 100 determines a modified global vector for modified SESE V' ("selected SESE"), but not for SESEs T, U and S. In a repetition of step 320', optimizer 100 uses the vectors (already obtained in earlier steps 320) of SESE S and the vector for SESE V'. For convenience, the vector analysis of step 320 is explained with more details for the example of FIG. 2. Optimizer 100 determines global (F) as the SESE vector for SESE U with the following calculations:

(i) $\text{global }(H) := \text{local }(H) \oplus \text{zero}$ (3.4)

(ii) $\text{global }(I) := \text{local }(I) \oplus \text{zero}$ (3.5)

(iii) $\text{global }(G) := \text{local }(G) \oplus \text{global }(I)$ (3.6)

(iv) $\text{global }(F) := \text{local }(F) \oplus (\text{global }(G), \text{global }(H))$ (3.7)

(v) $\text{global }(H) := \text{local }(H) \oplus \text{global }(I)$ (3.8)

(vi) $\text{global }(I) := \text{local }(I) \oplus \text{zero}$ (3.9)

(vii) $\text{global }(G) : \text{local}(G) \oplus \text{global }(I)$ (3.10)

(viii) $\text{global }(F) := \text{local }(F) \oplus \text{global }(H)$ (3.11)

The Roman numerals in parenthesis on the left side indicate a preferred analysis order. For example, global (H) at (i) is different from global (H) at (v). Conveniently, optimizer 100 applies depth ordering locally to SESE U and assigns analyzing indices "1" to instruction F, "2" to G, "3" to I, and "4" to H. Then (i), optimizer 100 combines the local vector of instruction "H" having the highest index "4" to the zero-vector (equation (3.4)). It is convenient to use the zero-vector initially. Then (ii), optimizer 100 combines local (I) to the zero-vector, because instruction E (which is the successor of instruction I) is located outside SESE U. This is an important aspect of the present invention. Preferably, optimizer 100 considers successor-instructions outside of the SESE as being non-existing for the calculation of the SESE vector. Hence, optimizer 100 applies equations (2.8) and (2.9) with the zero-vector for global_use (succ) and global_exh (succ) (global (succ)). Preferably, optimizer 100 goes through SESE U in iterations ((i) to (iv) and (v) to (viii)). To save memory space of optimizer 100, preliminary results (e.g., global in (i) to (vii) are, preferably, only stored temporarily. Persons of skill in the art know how to stop the iteration. Preferably, the iteration is stopped when global values on the left sides of the assignments (e.g., (3.4) to (3.11)) do not change any longer. For example, this is the case when global (H) in (v) equals global (H) in (i), global (I) in (vi) equals global (I) in (ii), global (G) in (vii) equals global (G) in (iii) and global (F) in further assignments equals global (F) in (iv).

In step 320, optimizer 100 calculates global (B) as the SESE vector for SESE T:

$$\text{global }(C) := \text{local }(C) \oplus \text{zero}$$

$$\text{global }(D) := \text{local }(D) \oplus (\text{zero, global }(C))$$

When a successor is outside a SESE, then the successor is assumed to be the reference vector (e.g., zero). For example, successor F of instruction D does not belong to SESE T which is currently analyzed. Therefore, the successor vector is assumed to be zero. Optimizer continues with:

$$\text{global }(B) := \text{local }(B) \oplus (\text{global }(D))$$

$$\text{global }(C) := \text{local }(C) \oplus \text{global }(B)$$

$$\text{global }(D) := \text{local }(D) \oplus (\text{zero, global } C))$$

In step 320, optimizer 100 analyses SESE S for with global (A) which becomes the SESE vector:

$$\text{global }(E) := \text{local }(E) \oplus \text{zero}$$

$$\text{global }(U) := \text{local }(U) \oplus \text{global }(E)$$

$$\text{global }(T) := \text{local }(T) \oplus \text{global }(U)$$

$$\text{global }(A) := \text{local }(A) \oplus \text{global }(T)$$

Preferably, a linear sequence does not require iteration.

In step 320, optimizer 100 can optionally obtain global (V) for the consecutive instructions J, K, L, and M of SESE V by forward traverse, for example, according to the general rule $$\text{global (inst)} := \text{local (inst)} \oplus \text{global (pred)}$$

wherein "pred" stands for "predecessor". The local vector local (inst) is represented by result vectors "res (inst)" and argument vectors "arg (inst)" of instructions J to M as follows:

| | |
|---|---|
| global_use (inst) | := + arg (inst) + global_use (pred) − global_exh (pred) |
| global_exh (inst) | := + res (inst) + global_exh (pred) − global_use (pred) |
| global_use (J) | := + arg (J) + zero − zero |
| global_use (J) | := + (1, 0, 0, 0, 1, 0) + (0, 0, 0, 0, 0, 0) − (0, 0, 0, 0, 0, 0) |
| | := (1, 0, 0, 0, 1, 0) |
| global_exh (J) | := res (J) + zero − zero |
| global_exh (J) | := + (0, 0, 0, 0, 0, 1) + (0, 0, 0, 0, 0, 0) − (0, 0, 0, 0, 0, 0) |
| | := (0, 0, 0, 0, 01) |
| global_use (K) | := + arg (K) + global use (J) − global_exh (J) |
| global_use (K) | := + (0, 0, 0, 0, 0, 1) + (1, 0, 0, 0, 1, 0) − (0, 0, 0, 0, 0, 1) |
| | := (1, 0, 0, 0, 1, 0) |
| global_exh (K) | := + res (K) + global_exh (J) − global_use (J) |
| global_exh (K) | := + (0, 1, 0, 0, 0, 0) + (0, 0, 0, 0, 01) − (1, 0, 0, 0, 1, 0) |
| | := (0, 1, 0, 0, 0, 1) |
| global_use (L) | := + arg (L) + global_use (K) − global_exh (K) |
| global_use (L) | := + (0, 0, 1, 0, 0, 0) + (1, 0, 0, 0, 1, 0) − (0, 1, 0, 0, 0, 1) |
| | := (1, 0, 1, 0, 1, 0) |
| global_exh (L) | := + res (L) + global_exh (K) − global_use (K) |
| global_exh (L) | := + (0, 0, 0, 0, 0, 1) + (0, 1, 0, 0, 01) − (1, 0, 0, 0, 1, 0) |
| | := (0, 1, 0, 0, 0, 1) |
| global_use (M) | := + arg (M) + global_use (L) − global_exh (L) |
| global_use (M) | := + (0, 0, 0, 1, 0, 0) + (1, 0, 1, 0, 1, 1) − (0, 1, 0, 0, 0, 1) |
| global_exh (M) | := + res (M) + global_exh (L) − global_use (L) |
| global_exh (M) | := + (0, 0, 0, 0, 0, 1) + (0, 1, 0, 0, 0, 1) − (1, 0, 1, 0, 1, 0) |
| | := (0, 1, 0, 0, 0, 1) |

Optionally, the question whether a certain variable can be used in a SESE ("first SESE", e.g., SESE T) or can not be used can be answered by evaluating the variable in the first SESE. The answer depends on the vectors of the succeeding SESE (e.g., SESE U, instruction E). Optionally, the following sub-steps are performed: (a) SESE vectors in the first SESE are provided which consider the variable (e.g., global (T)). (b) SESE vectors of SESE which succeed the first SESE are provided (e.g., global (U), instruction E). (c) It is checked if the variable is set in the last SESE vectors obtained in sub-step (b).

Method 300 of the present invention can also be described as a method for analyzing program 200 having the steps of: (a) calculating live information (e.g., local_use, local_exh) within basic blocks (e.g., single instructions or consecutive instructions without branches) of program 200; (b) evaluating live information within SESE structures (e.g., global_use, global_exh for SESE T, U, V) from the live information of the basic blocks; and (c) obtaining live information for program 200 from the live information of the SESE structures (from SESE T, U, V to SESE S and SESE W).

Preferably, the analysis in step (a) is performed in the order of the preferred execution flow (direction of arrows in FIG. 2) of program 200 ("forward traverse") and the analysis in step (b) is performed in the opposite order with iterations ("backward traverse").

Further, method 300 can also be described as a method for evaluating a resource vector (e.g., global vector for SESE W) in program 200 by the steps of: (a) analyzing SESE of program 200 by iteration (cf. step 320) and providing SESE vectors, wherein iteration starts with a reference vector (e.g., zero); and (b) analyzing program 200 using the SESE of step (a) to provide the resource vector.

Still further, the present invention can be described as a method for vector analyzing the resources of a program (e.g., program 200) in which the program flow (a) splits at branch instructions (e.g., Z, F, D) (b) merges at merge instructions (e.g., B, I, point 212), and (c) remains unchanged at linear instructions (e.g., J, K, L, M, A, E), the method comprising the following steps:

Establishing groups of instructions each having a single flow entry and a single flow exit (e.g., SESEs U, T, V);

In each group, providing vectors for the groups by selectively
(a) relating instruction vectors of a branch instruction at one time to two or more vectors of successor instructions (e.g., relating F, G, H as in equation (3.7),
(b) relating instruction vectors of a merge instruction at different times to vectors of its predecessor instructions (e.g., global (I)), and
(c) relating vectors of linear instructions to vectors of its successor instructions, wherein any of the vectors for successor instructions and predecessor instructions are initially set to a reference vector (e.g., zero) when the successor instructions or predecessor instructions do not belong to the group; and Combining the group vectors (e.g., for SESE U, T, V, parent SESE S) to a program vector (e.g., for SESE W).

Persons of skill in the art are able, based on the description herein, to provide optimizer 100 by hardware and software without further explanation. While the invention has been described in terms of particular structures, devices and methods, those of skill in the art will understand based on the description herein that it is not limited merely to such examples and that the full scope of the invention is properly determined by the claims that follow.

What is claimed is:

1. A method for optimizing a program having instructions which access resources, said method comprising the following steps:

determining local vectors for said instructions which indicate the use of said resources by said instructions, wherein said local vectors are provided as first partial vectors and as second partial vectors;

scanning said program for Single-Entry-Single-Exit (SESE) structures in a child-parent-program hierarchy; and in repetitions, going up in the hierarchy, determining SESE vectors from said local vectors, said SESE vectors indicating the use of said resources by said SESE structures, wherein said SESE vectors are provided in iterations:
(a) as first global vectors by adding said first partial vectors and subtracting said second partial vectors and adding first global successor vectors, and
(b) as second global vectors by adding said second partial vectors and subtracting said first partial vectors and adding second global successor vectors.

2. The method of claim 1 further comprising the following steps:

modifying said program by deleting resources which are identified by said SESE vectors as redundant resource; and determining new SESE vectors only for SESE structures that have been modified.

3. The method of claim 1 wherein for successors which occur as multiple successors, said determining SESE vectors step is characterized by the following:
(a) said first global vectors of the instructions are provided by combination of the first global vectors of the multiple successors, and
(b) said second global vectors of the instructions are provided by intersection of the second global vectors of the multiple successors.

4. The method of claim 1, wherein in said determining SESE vectors step, local vectors at SESE borders are initially compared to a reference vector.

5. The method of claim 4, wherein said reference vector is a zero vector.

6. The method of claim 1 comprising a step of evaluating a variable in a first SESE having the substeps of:
(a) providing SESE vectors in said first SESE considering said variable;
(b) providing SESE vectors of SESE which succeed said first SESE; and
(c) checking if the variable is set in the last SESE vectors obtained in sub-step (b).

7. A method for analyzing a program, comprising the steps of:
(a) calculating live information within basic blocks of said program using single forward traverse;
(b) evaluating live information within Single-Entry-Single-Exit (SESE) structures from the live information of said basis block using iterative backward traverse; and
(c) obtaining live information for said program from the live information of said SESE structures.

8. The method of claim 7 wherein live information is provided in first vectors for used resources and second vectors for resources which are no longer used.

9. A method for evaluating a resource vector in a program by the steps of:
(a) analyzing SESE of the program by iteration within the SESE and providing SESE vectors, wherein iteration starts with a reference vector; and
(b) analyzing the program using the SESE vectors of step (a) to provide said resource vector.

10. The method of claim 9 wherein in said step (a), iteration is stopped when SESE vectors do not change any longer.

11. The method of claim 9 wherein said reference vector is a zero-vector.

12. A method for vector analyzing the resources of a program in which the program flow (a) splits at branch instructions, (b) merges at merge instructions, and (c) remains unchanged at linear instructions, said method comprising the following steps:

establishing groups of instructions each having a single flow entry and a single flow exit;

in each group, providing vectors for said groups by selectively (a) relating instruction vectors of a branch instruction at one time to two or more vectors of successor instructions (b) relating instruction vectors of a merge instruction at different times to vectors of its predecessor instructions, and (c) relating vectors of linear instructions to vectors of its successor instructions, wherein any of said vectors for successor instructions and predecessor instructions are initially set to a reference vector when said successor instructions or predecessor instructions do not belong to said group; and combining said group vectors to a program vector.

13. The method of claim 12 further group modifying, and wherein said providing vectors step is repeated only for group which have been modified.

14. A program optimizer, comprising:

a memory which stores the program to be optimized and which stores optimization software, and a processor receiving commands from said optimization software for (a) determining local vectors in instructions of said program to indicate the use of resources by said instructions, wherein said local vectors are provided as first partial vectors and as second partial vectors;

(b) scanning said program for Single-Entry-Single-Exit (SESE) structures; and (c) determining SESE vectors from said local vectors, said SESE vectors indicating the use of said resources by said SESE structures, wherein said SESE vectors are provided in iterations (c1) as first global vectors by adding said first partial vectors and subtracting said second partial vectors and adding first global successor vectors, and (c2) as second global vectors by adding said second partial vectors and subtracting said first partial vectors and adding second global successor vectors.

* * * * *